United States Patent [19]
Thorn et al.

[11] Patent Number: 6,040,989
[45] Date of Patent: Mar. 21, 2000

[54] DEVICE AND METHOD FOR GENERATING THREE-PHASE SINE WAVES USING TWO PULSE-WIDTH MODULATORS

[75] Inventors: J. Stephen Thorn, Florissant; Arthur E. Woodward, Manchester, both of Mo.

[73] Assignee: Emerson Electric Co, St. Louis, Mo.

[21] Appl. No.: 09/306,614

[22] Filed: May 6, 1999

[51] Int. Cl.[7] .................................................. H02M 1/12
[52] U.S. Cl. .............................................. 363/41; 363/98
[58] Field of Search ........................................ 363/41, 98

[56] References Cited

U.S. PATENT DOCUMENTS

| D. 308,195 | 5/1990 | Profumo | D14/113 |
|---|---|---|---|
| 4,344,123 | 8/1982 | Bhagwat et al. | 363/43 |
| 4,376,296 | 3/1983 | Bhagwat et al. | 363/138 |
| 4,405,977 | 9/1983 | Bhagwat et al. | 363/124 |
| 4,912,378 | 3/1990 | Vukosavic | 318/254 |
| 5,491,622 | 2/1996 | Carosa | 363/98 |
| 5,570,256 | 10/1996 | Schoen et al. | 361/31 |
| 5,629,870 | 5/1997 | Farag et al. | 364/551.01 |
| 5,644,458 | 7/1997 | Schoen et al. | 361/31 |
| 5,780,986 | 7/1998 | Shelton et al. | 363/41 |
| 5,852,558 | 12/1998 | Julian et al. | 363/132 |

OTHER PUBLICATIONS

John Deatherage and JeffHunsinger, Brushless DC Motor Control Using the MC68HC705MC4, Motorola Semiconductor Application Note, pp. 1–16, Feb. 1997.

Katsunori Taniguchi, Yasumasa Ogino, and Hisaichi Irie, "PWM Technique for Power MOSFET Inverter." IEEE Transactions on Power Electronics, vol. 3—3, pp. 328–334, Jul. 1988.

*Primary Examiner*—Peter S. Wong
*Assistant Examiner*—Gary L. Laxton
*Attorney, Agent, or Firm*—Arnold White & Durkee; Mark L. Gleason

[57] ABSTRACT

A device and method for providing three-phase pulse-width modulated sine waves includes an inverter including first, second and third legs, and first and second PWM generators, the first PWM generator is coupled to selectively provide an output to the first inverter leg or the third inverter leg, and the second PWM generator is coupled to selectively provide an output to the second inverter leg or the third inverter leg. The first PWM generator provides an output to the first inverter leg during first and second 120° segments of a 360° electrical cycle, and the first PWM generator provides an output to the third inverter leg during a third 120° segment. The second PWM generator provides an output to the third inverter leg during the first 120° segment, and the second PWM generator provides an output to the second inverter leg during the second and third 120° segments, thus providing generation of three-phase pulse-width modulated sine waves using fewer than three pulse-width modulators.

20 Claims, 4 Drawing Sheets

3
DEVICE AND METHOD FOR GENERATING THREE-PHASE SINE WAVES USING TWO PULSE-WIDTH MODULATORS

BACKGROUND OF THE INVENTION

1. Field of the Invention

This invention relates generally to electric motor control, and more particularly, to a method and apparatus for three-phase motor control using a microcontroller having two pulse-width modulators.

2. Description of Related Art

An alternating current ("AC") is a current that is alternately positive and negative at regular intervals. One complete segment of positive and negative values is called a cycle, and every cycle defines $2\pi$ radians, or 360° electrical. In other words, each electrical cycle is divided into 360 equal parts. In this disclosure, the electrical cycle will be discussed in terms of electrical degrees for the sake of simplicity.

Many types of devices, such as electric motors, require electrical power to Is operate, and the most common types of electric motors are powered using AC voltages. AC motors may be single-phase or polyphase machines. An example of a polyphase AC motor is a three-phase induction motor, in which three-phase sinusoidal AC voltages are applied to the motor's windings to create a rotating magnetic field. AC induction motors are popular for several reasons, including high robustness, reliability, low price and high efficiency. In such three-phase AC systems, the three AC wave forms are 120° out of phase. In other words, the peaks of the respective AC wave forms are 120° apart.

Power conversion systems are commonly used to provide single phase or multiphase AC power to machines requiring electrical energy. An example of such a power conversion system is a DC-to-AC inverter, which typically includes inverter switching devices connected in a bridge formation between the DC bus lines and output terminals of the power conversion system. The inverter switching devices are controlled to connect the power on the DC bus lines to the system output terminals in a desired pattern such that AC output signals having the desired frequency and amplitude are synthesized from the DC power on the DC bus lines. Various modulation strategies may be employed for controlling the inverter switching devices, including sine wave pulse-width modulation ("PWM").

PWM consists of a sequence of pulses at a "carrier" frequency much higher than that of the waveshape to be synthesized. The duration of each pulse varies according to the instantaneous magnitude of the synthesized wave. The "duty cycle" or "duty ratio" is the ratio of the pulse width to the total PWM period (reciprocal of carrier frequency). The average voltage seen at the output of a PWM switched DC bus is equal to the duty ratio multiplied by the DC bus voltage. Thus, if the duty ratio varies with time according to a sine function, the output voltage, appropriately low-pass filtered to reject the carrier frequency, will be the same sine function. Three-phase PWM requires three such switches.

FIG. 1 is a block diagram illustrating a prior art three-phase output bridge of a DC-to-AC inverter. This is a popular power topology for driving an AC induction motor. Each of the three half-bridges are pulse-width modulated independently, and a three-phase AC sine wave is applied to the three-phase motor. The output bridge 10 includes three legs 12, with a corresponding PWM generator 14 coupled to a switch driver 15 of each inverter leg 12 to provide a PWM signal that is used to control upper and lower switches 16, 18. The upper and lower switches 16, 18 of each inverter leg 12 are controlled by the switch driver 15 to couple output terminals 20 either to a positive bus 22 or a negative bus 24 to provide the desired three-phase output.

Several companies offer microcontroller chips that include motor controller peripherals. As shown in FIG. 1, the generation of three-phase sine waves requires three PWM generators; however, chips having three PWM generators are often more expensive than chips having fewer PWM generators. Another popular modulation scheme is known as "space vector modulation," which requires six center-symmetric PWM outputs to drive an output bridge. Unfortunately, chips capable of such space vector modulation also tend to be more expensive than motor control chips having fewer than three PWM generators.

Thus, a need exists for providing three-phase sine waves from a microcontroller having less than three PWM generators. The present invention addresses these, and other, shortcomings associated with the prior art.

SUMMARY OF THE INVENTION

In one aspect of the invention, a method for providing a pulse-width modulated three-phase sine wave output from a three-phase inverter is presented. Each sine wave defines a 360° electrical cycle, with each cycle including three 120° segments that each define phase angles of 0–120°. During the first 120° segment, PWM signals are output from a first PWM generator to a first leg of the inverter, and PWM signals are output from a second PWM generator to a third leg of the inverter. During the second 120° segment, PWM signals are output from the first PWM generator to the first leg of the inverter, and PWM signals are output from the second PWM generator to a second leg of the inverter. During the third 120° segment, PWM signals are output from the first PWM generator to the third leg of the inverter, and PWM signals are output from the second PWM generator to the second leg of the inverter.

In accordance with further aspects of the invention, additional method steps may be included. During the first and third 120° segments, PWM signals are generated that correspond to the sine of the phase angles by the first PWM generator, and PWM signals are generated that correspond to the sine of 120° minus the phase angles by the second PWM generator. During the second 120° segment, PWM signals are generated that correspond to the sine of the phase angles by the second PWM generator, and PWM signals corresponding to the sine of 120° minus the given phase angles are generated by the first PWM generator.

In accordance with other aspects of the invention, a three-phase motor control device includes an inverter having first, second and third legs, and first and second PWM generators. The first PWM generator is coupled to selectively provide an output to the first inverter leg or the third inverter leg, and the second PWM generator is coupled to selectively provide an output to the second inverter leg or the third inverter leg. In specific embodiments, the first PWM generator provides an output to the first inverter leg during first and second 120° segments of a 360° electrical cycle, and the first PWM generator provides an output to the third inverter leg during a third 120° segment. The second PWM generator provides an output to the third inverter leg during the first 120° segment, and the second PWM generator provides an output to the second inverter leg during the second and third 120° segments.

In accordance with still further aspects of the invention, a three-phase motor system includes a motor having a stator and rotor mounted to rotate relative to the stator, with a plurality of windings disposed in the stator defining three phases. An inverter includes first, second and third legs coupled to the phases, and first and second PWM generators are provided. The first PWM generator is coupled to selectively provide an output to the first inverter leg or the third inverter leg, and the second PWM generator is coupled to selectively provide an output to the second inverter leg or the third inverter leg.

BRIEF DESCRIPTION OF THE DRAWINGS

Other objects and advantages of the invention will become apparent upon reading the following detailed description and upon reference to the drawings in which.

Figure 1:
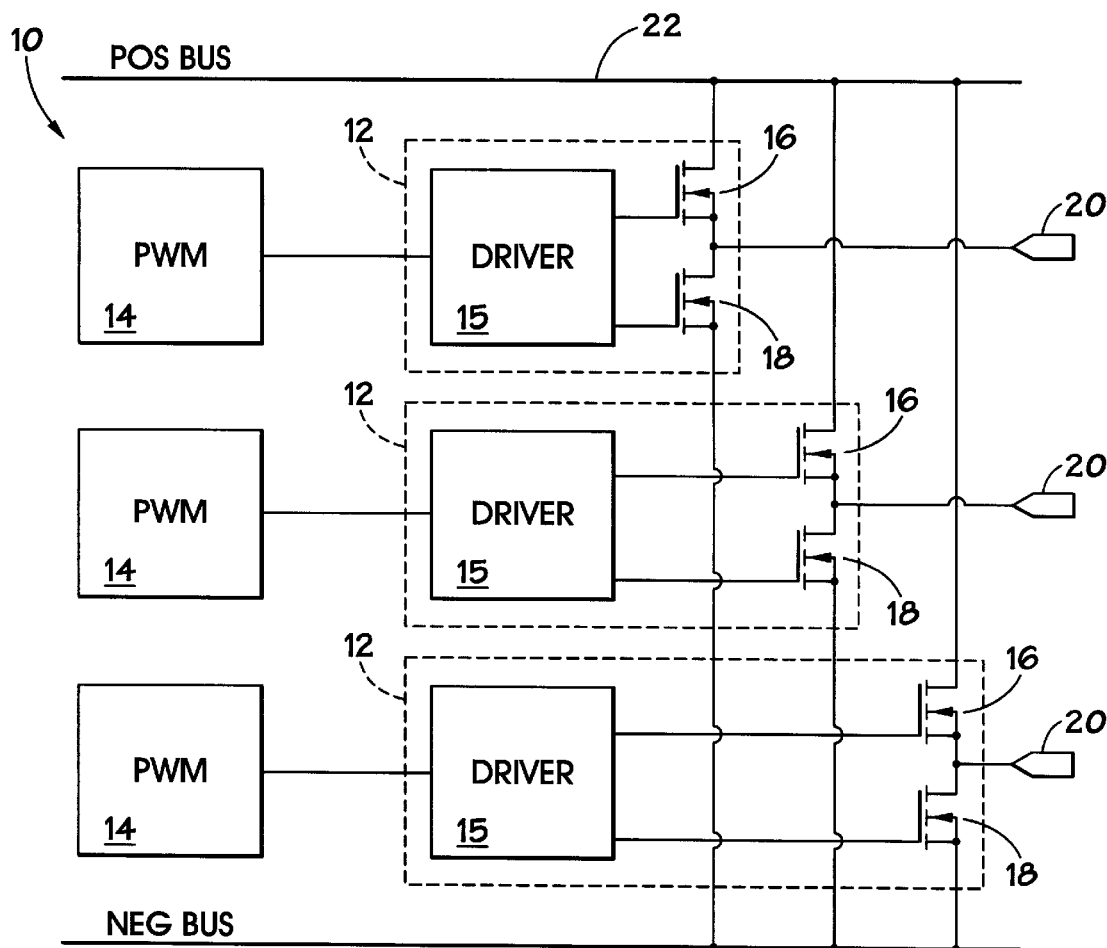
FIG. 1 is a block diagram illustrating a prior art three-phase inverter.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As discussed in the Description of Related Art section herein above, known PWM inverters generally require at least three PWM generators to produce three-phase, PWM sine wave output. A PWM generator is coupled to each inverter leg, such that a PWM sine wave is provided to each of the motor's three phases. However, it is not necessary for each inverter leg to output a sinusoidal wave form to produce a sine wave difference between two motor phases. Such a technique is described, for example, in an article by Taniguchi, Ogino, and Irie entitled *PWM Technique for Power MOSFET Inverter*, IEEE Transactions of Power Electronics, Vol. 3, No. 3, July 1988, which is incorporated herein by reference.

Figure 2:
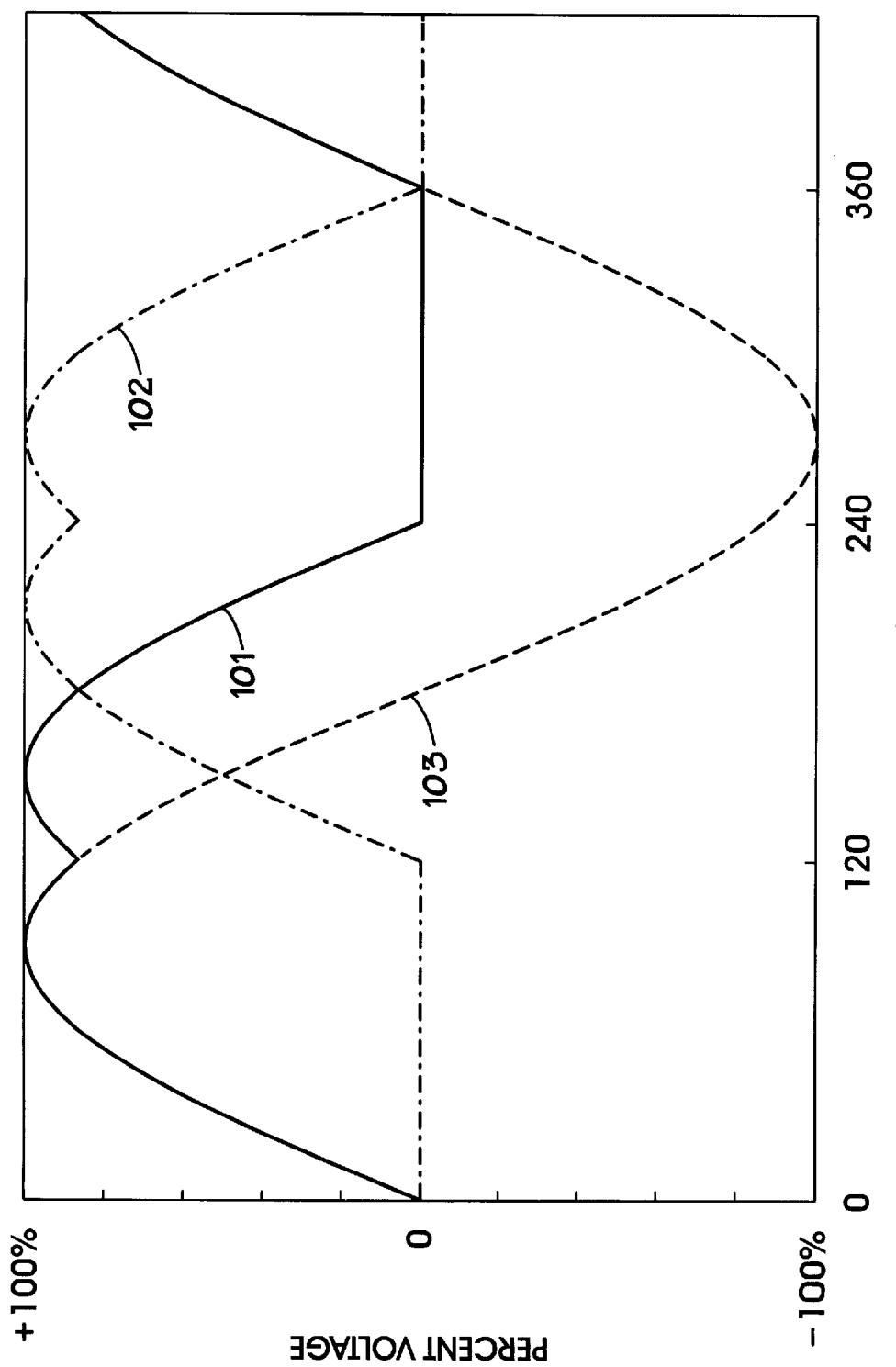
FIG. 2 is a graph illustrating three wave forms generated in accordance with the present invention.

FIG. 2 illustrates three voltage wave forms 101, 102, 103. Wave form 103, a sine wave, represents wave form 101 minus wave form 102. Further, as shown in FIG. 2, wave forms 101 and 102 are "active" during only two-thirds of the 360° electrical cycle. Thus, the output of wave form 101 is zero from 0 to 120°, and the output of wave form 102 is zero from 240–360°. Wave forms 101 and 102 may be generated by two respective PWM generators. However, each PWM generator would be active during only two thirds of the electrical cycle. During the remaining third, each PWM generator's output would be zero.

Figure 3:
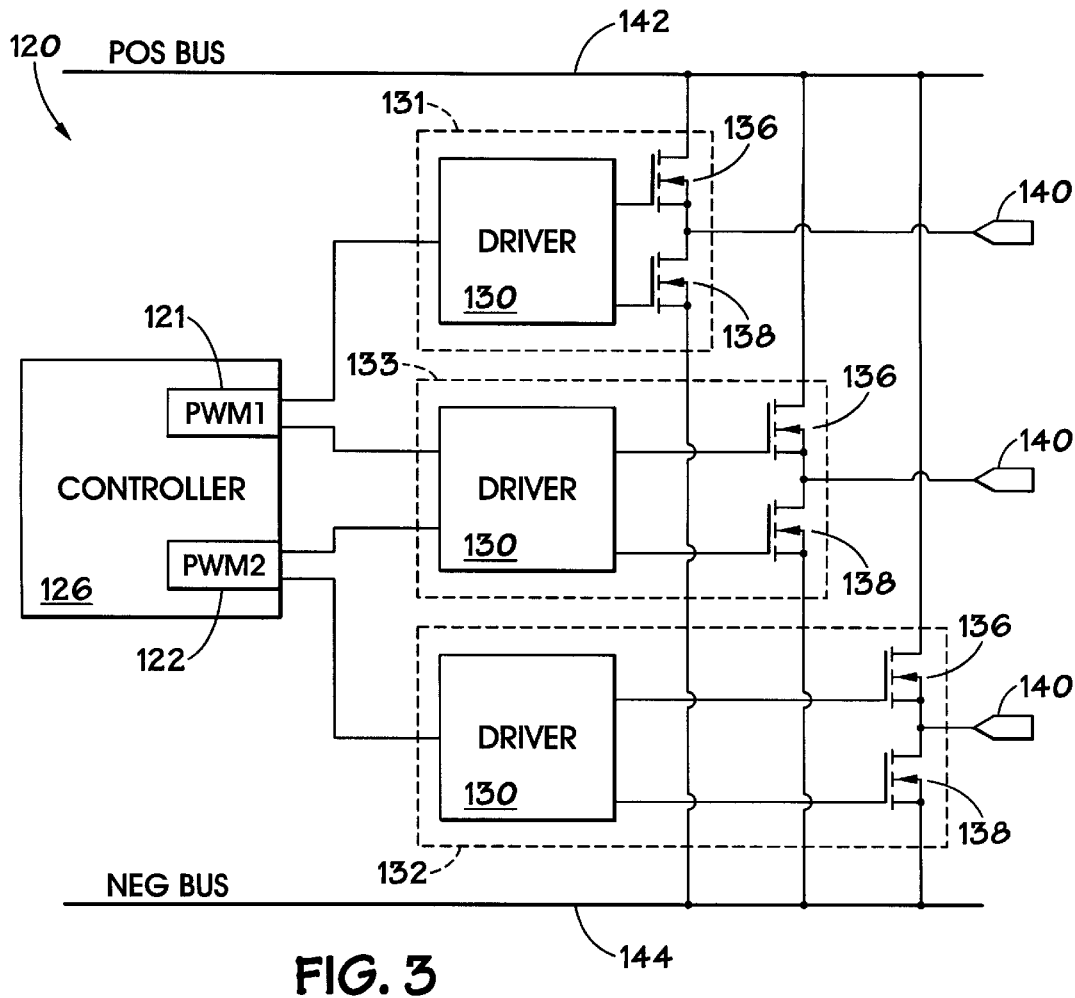
FIG. 3 is a block diagram illustrating a three-phase inverter in accordance with the present invention.

In accordance with aspects of the present invention, the "inactive," or zero-output, segments of the electrical cycle for each of the respective PWM generators are used to generate a third wave form, thereby providing three-phase PWM sine waves using only two PWM generators. FIG. 3 schematically illustrates a portion of a three-phase inverter in accordance with an embodiment of the present invention. The inverter 120 includes two PWM generators 121, 122. In the exemplary embodiment illustrated, the PWM generators 121, 122 are embodied in a microcontroller 126.

In a specific embodiment of the inverter 120, the microcontroller 126 comprises a Motorola MC68HC705MC4 ("MC4"), which has a PWM system that routes signals from two PWM generators to six pins. The MC4 chip does not have the PWM outputs arranged in complementary center-symmetric pairs, so space vector modulation is not possible with this chip. Since the MC4 only has two PWM generators, conventional three-phase sinusoidal modulation is also not possible. The present invention allows using a relatively inexpensive chip, such as the MC4, having only two PWM generators to generate modulated three-phase sinusoidal output. While the embodiment illustrated in FIG. 3 is disclosed in terms of the MC4 chip, it would be a routine undertaking for one skilled in the art having the benefit of this disclosure to implement the PWM techniques described herein using other devices or combinations of devices having at least two PWM generators.

The PWM generators 121, 122 are coupled to switch drivers 130 of first, second and third legs 131, 132, 133. Each of the legs 131, 132, 133 includes upper and lower power switches 136, 138 coupled to a respective switch driver 130. The power switches 136, 138 illustrated in FIG. 3 comprise power metal-oxide semiconductor field effect transistors (MOSFETs), though any suitable power switching device may be used, such as bi-polar devices, IGBTs, mechanical switches, etc. Each of the inverter legs 131, 132, 133 further includes an output terminal 140, by which the PWM signal is provided to a motor (not shown) from the inverter 120. The upper and lower switches 136, 138 of each inverter leg 131, 132, 133 operate to connect the respective output terminal 140 either to a positive bus 142 or a negative bus 144. In one embodiment, the switch drivers 130 controlling the upper and lower switches 136, 138 of each inverter leg 131, 132, 133 comprise IR2104 driver chips, available from International Rectifier. The IR2104 chip includes an IN input, which determines which of the switches 136, 138 to turn on, and an SD input, which disables turning on either the upper or lower switch 136, 138. Further, the IR2104 does not allow both the upper and lower switches 136, 138 to be simultaneously on, and it introduces a delay of 600 ns between turning one of the switches 136, 138 off and the other switch 136, 138 on.

As illustrated in FIG. 3, the first PWM generator 121 is connected to the switch driver 130 of the first and third inverter legs 131, 133, and the second PWM generator 122 is connected to the switch driver 130 of the second and third inverter legs 132, 133. The PWM generators 121, 122 are coupled to the inverter legs 131, 132, 133 such that the generated PWM signal may be selectively output to either of the inverter legs connected thereto. Thus, the third inverter leg 133 may receive the PWM output from either the first or second PWM generator 121, 122.

Figure 4:
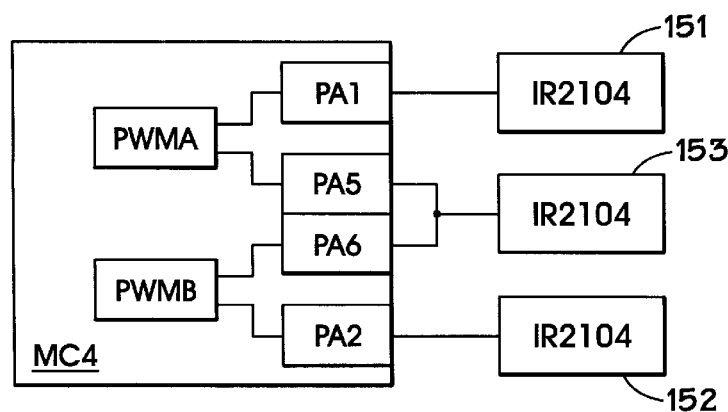
FIG. 4 is a block diagram illustrating pin connections of an exemplary embodiment of the present invention.

FIG. 4 conceptually illustrates the pin connections in an MC4 chip in accordance with an exemplary embodiment of the present invention. The MC4 includes two PWM generators, "PWMA" and "PWMB." The output of PWMA may be selectively routed to any of three pins, and likewise, the output of PWMB may be selectively routed to any of three other pins. Thus, in the exemplary embodiment illustrated in FIG. 4, pin PA1, which can carry the output of PWMA, is connected to the IN pin of an IR2104 driver chip 151 of one inverter leg, pin PA2, which can carry the output of PWMB, is connected to the IN pin of an IR2104 driver chip 152 of another inverter leg, and pins PA5 and PA6 are both connected to the IR2104 driver chip 153 of the remaining inverter leg, allowing the output of either PWMA or PWMB to be directed to the IN pin of the IR2104 driver chip 153 of the third inverter leg.

Referring back to FIGS. 2 and 3, assume that the first PWM generator 121 outputs a PWM signal corresponding to wave form 101 to the first leg 131 of the inverter 120, and the second PWM generator 122 outputs a PWM signal corresponding to wave form 102 to the second leg 132. During the first 120° segment of the 360° electrical cycle (0–120°), the output to the second leg 132 from the second PWM generator 122 is zero volts. During the third 120° segment (240–360°), the output to the first leg 131 from the first PWM generator 121 is zero volts. Rather than outputting zero volts to the second leg 132 and first leg 131 during the first and third 120° segments, respectively, of the electrical cycle, the PWM generators 121, 122 are disconnected from the second and first legs 132, 131 during these segments. Thus, during these segments of zero volt output, the first and second PWM generators 121, 122 each generate a portion of a third wave form that is output to the third leg 133.

Figures 5, 6:
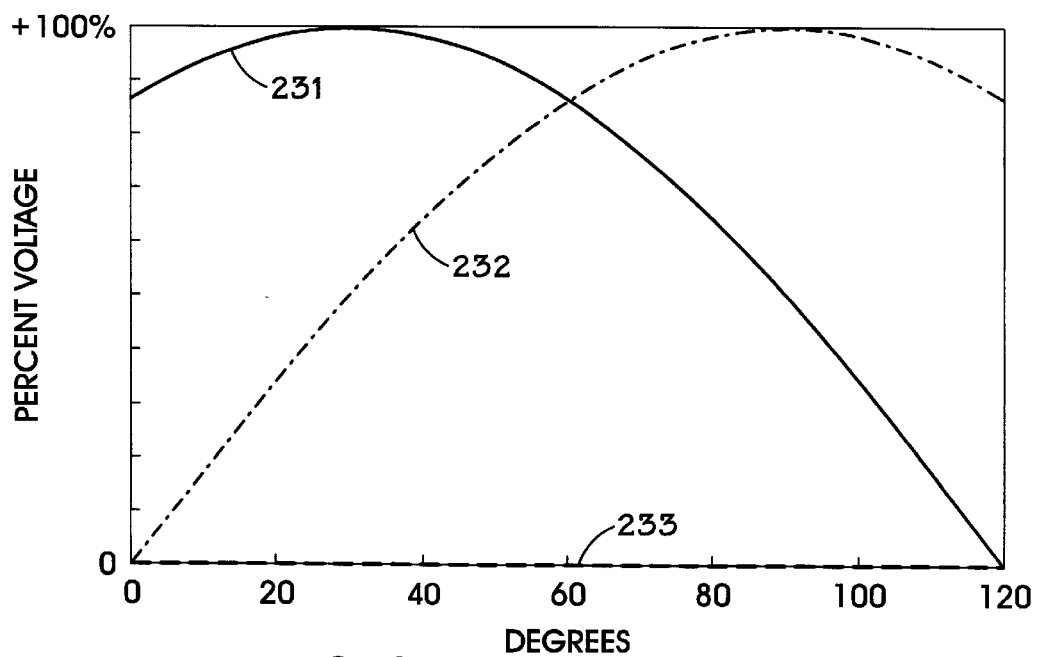
FIG. 5 conceptually illustrates aspects of a method for generating three-phase sine waves in accordance with the present invention.
FIG. 6 is a graph illustrating three voltage wave forms received by the three inverter legs of the inverter illustrated in FIG. 3.

FIG. 5 illustrates a method for generating three-phase PWM sine wave output in accordance with an embodiment of the present invention. Each 360° electrical cycle is divided into three 120° segments, which each define phase angles from 0–120°. During the first 120° segment, in box 210, PWM signals from the first PWM generator 121 are output to the first leg 131, and in box 212, PWM signals from the second PWM generator 122 are output to the third leg 132 of the inverter 120. During the second 120° segment, in box 214, the first PWM generator 121 continues to output PWM signals to the first leg 131. In box 216, however, the second PWM generator 122 outputs PWM signals to the second leg 132. During the third 120° segment, in box 218, PWM signals from the first PWM generator 121 are output to the third leg 133 of the inverter 120, and the second PWM generator 122 continues to output PWM signals to the second leg 132. During the first 120° segment, the second leg 132 is effectively disconnected from the first and second PWM generators 121, 122. In the second 120° segment, the third leg 133 is disconnected, and in the third 120° segment, the first leg 131 is disconnected.

FIG. 6 illustrates three effective wave forms 231, 232, 233 received by each of the three inverter legs 131, 132, 133 during a given 120° segment. In one embodiment, the first leg 131 receives the PWM modulated voltage wave form 231, the third leg 133 receives wave form 232, and the second leg 132 is disconnected from the second PWM generator 122 and thus receives zero volts, represented by wave form 233. To generate the proper modulated wave forms, the 360° electrical cycle is divided into three 120° segments as disclosed above. Each segment defines phase angles θ from 0–120°. Wave form 231 shown in FIG. 6 is defined by sin(θ), and wave form 232 is defined by sin(120°−θ). Therefore, for each electrical cycle, the first PWM generator 121 generates PWM signals that result in a modulated wave form defined by sin(θ) for the first and third 120° segments, and during the second 120° segment, it generates a wave form defined by sin(120°−θ). The second PWM generator outputs modulated wave forms defined by sin(120°−θ) during the first and third 120° segments, and sin(θ) during the second 120° segment.

With reference to an embodiment of the invention employing the MC4 chip, the MC4 includes a lookup table storing duty ratio values corresponding to phase angles. The table lookup functions are sin(θ) and sin(120°−θ), as disclosed above for the first and second PWM generators 121, 122. Each leg 131, 132, 133 thus follows a sequence of receiving PWM signals corresponding to sin(θ) for one 120° segment, sin(120°−θ) for the is next 120° segment, and followed by zero volts for the final 120° segment. The duty ratio of the first and second PWM generators 121, 122 is updated 5,000 times per second by the MC4. The duty ratios for sin(θ) and sin(120°−θ) are looked up, a number proportional to motor frequency is added to θ and the duty ratios are updated for the new value of θ.

After the table lookup of the wave form shape, the resulting value is multiplied by the desired voltage, so that the amplitude of the resultant motor voltage can be varied to maintain an appropriate volts/frequency relationship. If the result of the voltage multiplication exceeds 100% duty ratio, the duty ratio value is limited to 100%, producing a clipped wave form. Driving the amplitude into such a saturated regime produces higher effective voltage seen by the motor. The resulting motor voltage is higher than the normal sine wave voltage, but less than the maximum square wave voltage while reducing undesirable harmonics.

Figure 7:
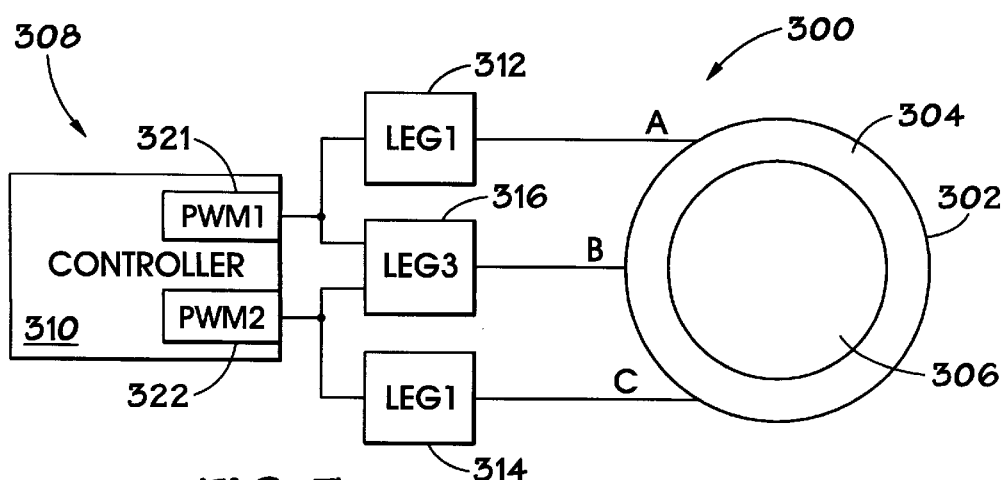
FIG. 7 is a block diagram illustrating a motor system in accordance with the present invention.

An inverter in accordance with aspects of the present invention is suitable for use with several varieties of three-phase electric motors. FIG. 7 is a block diagram illustrating such an implementation in a motor system 300. The motor system 300 includes an electric motor 302, such as a brushless permanent magnet ("BPM") motor or AC induction motor. The motor 302 includes a stator 304 and a rotor 306 mounted to rotate relative to the stator. The stator 304 further includes three phase windings (not shown) distributed around the stator 304 to produce a roughly sinusoidal distribution. An inverter 308 provides PWM three-phase sinusoidal voltage wave forms to phases A, B and C of the motor 302. The inverter 308 includes a microcontroller 310 and three inverter legs 312, 314, 316. The microcontroller 310 has two PWM generators 321, 322. The first PWM generator 321 is coupled to the first and third legs 312, 316, and the second PWM generator 322 is coupled to the second and third legs 314, 316. When three-phase AC voltages are applied to the stator windings by the inverter 308, a rotating magnetic field is produced that causes the rotor 306 to rotate.

Thus, the present invention provides an inverter having inexpensive, quiet and efficient performance. It will be appreciated by those of ordinary skill in the art having the benefit of this disclosure that the embodiment illustrated above is capable of numerous variations without departing from the scope and spirit of the invention. It is fully intended that the invention for which a patent is sought encompasses within its scope all such variations without being limited to the specific embodiment disclosed above. Accordingly, the exclusive rights sought to be patented are as described in the claims below.

What is claimed is:

1. A method for providing a pulse-width modulated three-phase sine wave output from a three-phase inverter, each sine wave defining a 360° electrical cycle, each cycle including three 120° segments that each define phase angles of 0–120°, the method comprising:

during the first 120° segment, outputting PWM signals from a first PWM generator to a first leg of the inverter, and outputting PWM signals from a second PWM generator to a third leg of the inverter;

during the second 120° segment, outputting PWM signals from the first PWM generator to the first leg of the inverter, and outputting PWM signals from the second PWM generator to a second leg of the inverter; and during the third 120° segment, outputting PWM signals from the first PWM generator to the third leg of the inverter, and outputting PWM signals from the second PWM generator to the second leg of the inverter.

2. The method of claim 1, further comprising:

during the first and third 120° segments, generating PWM signals corresponding to the sine of the phase angles by the first PWM generator, and generating PWM signals corresponding to the sine of 120° minus the phase angles by the second PWM generator; and during the second 120° segment, generating PWM signals corresponding to the sine of the phase angles by the second PWM generator, and generating PWM signals corresponding to the sine of 120° minus the phase angles by the first PWM generator.

3. The method of claim 1, further comprising:

during the first 120° segment, coupling the first PWM generator to the first leg of the inverter and coupling the second PWM generator to the third leg of the inverter;

during the second 120° segment, decoupling the second PWM generator from the third leg of the inverter and coupling the second PWM generator to the second leg of the inverter; and during the third 120° segment, decoupling the first PWM generator from the first leg of the inverter and coupling the first PWM generator to the third leg of the inverter.

4. The method of claim 2, wherein generating PWM signals includes determining a duty ratio corresponding to the sine of a given phase angle;

determining a duty ratio corresponding to the sine of 120° minus the given phase angle; and updating the phase angle.

5. The method of claim 4, wherein determining the duty ratios includes performing a table look up.

6. The method of claim 4, wherein generating PWM signals includes multiplying the sine functions by a desired voltage.

7. A method for providing a pulse-width modulated three-phase sine wave output from a three-phase inverter, each sine wave defining a 360° electrical cycle, each cycle including three 120° segments defining phase angles of 0 and 120°, the method comprising:

generating PWM signals corresponding to the sine of the phase angles during the first and third segments, and generating PWM signals corresponding to 120° minus the phase angles during the second segment by a first PWM generator;

generating PWM signals corresponding to the sine of the phase angles during the second segment, and generating PWM signals corresponding to 120° minus the phase angles during the first and third segments by a second PWM generator;

coupling the first PWM generator to a first leg of the inverter during the first and second segments, and to a third leg of the inverter during the third segment; and coupling the second PWM generator to the third leg during the first segment, and to a second leg of the inverter during the second and third segments.

8. The method of claim 7, further comprising:

decoupling the second PWM generator from the third leg during the second segment; and decoupling the first PWM generator from the first leg during the third segment.

9. A three-phase motor control device, comprising:

an inverter including first, second and third legs; and first and second PWM generators, the first PWM generator coupled to selectively provide an output to the first inverter leg or the third inverter leg, and the second PWM generator coupled to selectively provide an output to the second inverter leg or the third inverter leg.

10. The device of claim 9, wherein:

the first PWM generator provides an output to the first inverter leg during first and second 120° segments of a 360° electrical cycle, and the first PWM generator provides an output to the third inverter leg during a third 120° segment; and the second PWM generator provides an output to the third inverter leg during the first 120° segment, and the second PWM generator provides an output to the second inverter leg during the second and third 120° segments.

11. The device of claim 9, wherein:

the first PWM generator includes first and second output terminals, with the first output terminal coupled to the first inverter leg and the second output terminal coupled to the third inverter leg; and the second PWM generator includes first and second output terminals, with the first output terminal coupled to the third inverter leg and the second output terminal coupled to the second inverter leg.

12. The device of claim 9, wherein each inverter leg further comprises first and second switches, each of the first switches operable to couple and decouple respective inverter outputs to a positive bus, and each of the second switches operable to couple and decouple the respective inverter outputs to a negative bus.

13. The device of claim 12, wherein the first and second switches comprise MOSFETs.

14. The device of claim 12, wherein each inverter leg further comprises a switch driver, and wherein each of the first and second switches is coupled to a respective switch driver.

15. A three-phase DC-to-AC inverter, comprising:

first, second and third legs;

a first PWM generator operable to provide an output to the first inverter leg during first and second 120° segments of a 360° electrical cycle, and provide an output to the third inverter leg during a third 120° segment; and a second PWM generator operable to provide an output to the third inverter leg during the first 120° segment, and provide an output to the second inverter leg during the second and third 120° segments.

16. The inverter of claim 15, wherein the first PWM generator is coupled to the first inverter leg and the third inverter leg, and the second PWM generator is coupled to the second inverter leg and the third inverter leg.

17. A three-phase motor system, comprising:

a motor having a stator and rotor mounted to rotate relative to the stator;

a plurality of windings disposed in the stator defining three phases;

an inverter including first, second and third legs coupled to the phases; and first and second PWM generators, the first PWM generator coupled to selectively provide an output to the first inverter leg or the third inverter leg, the second PWM generator coupled to selectively provide an output to the second inverter leg or the third inverter leg.

18. The motor system of claim 17, wherein:

the first PWM generator provides an output to the first inverter leg during first and second 120° segments of a 360° electrical cycle, and the first PWM generator provides an output to the third inverter leg during a third 120° segment; and the second PWM generator provides an output to the third inverter leg during the first 120° segment, and the second PWM generator provides an output to the second inverter leg during the second and third 120° segments.

19. The motor system of claim 18, wherein the motor comprises an induction motor.

20. The motor system of claim 18, wherein the motor comprises a brushless permanent magnet motor.

* * * * *